May 11, 1937. T. J. SMULSKI 2,079,881
WINDSHIELD CLEANER FASTENING DEVICE
Filed May 16, 1934
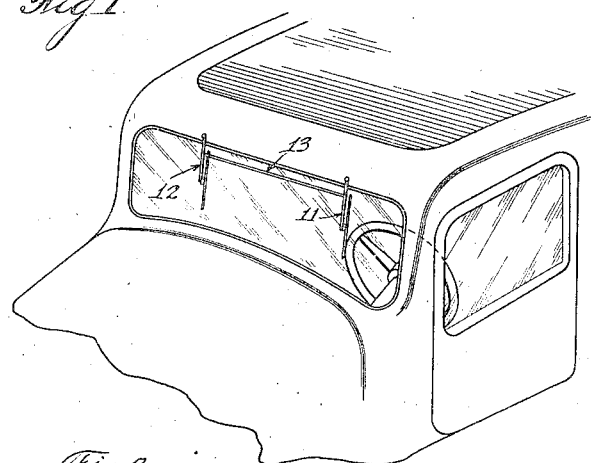
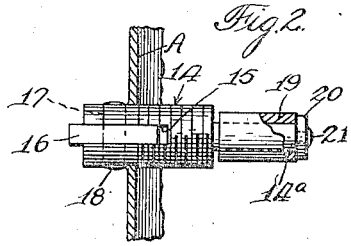
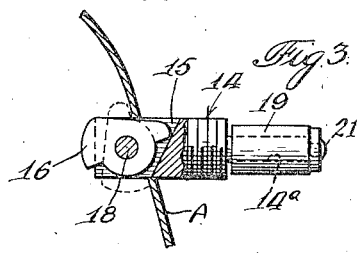
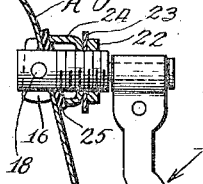
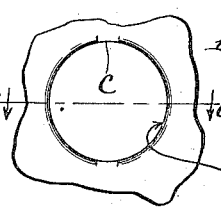
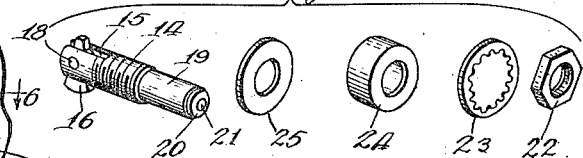
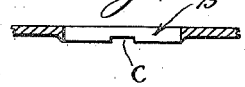
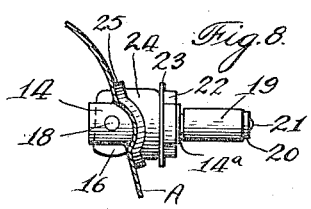
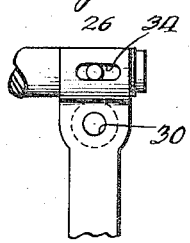
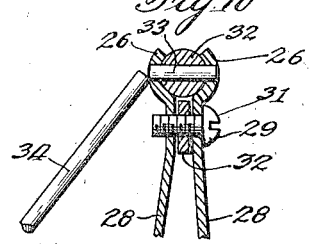
Inventor
Theodore J. Smulski
By Jones, Addington, Ames & Seibold
Attys Patented May 11, 1937

2,079,881

UNITED STATES PATENT OFFICE 2,079,881

WINDSHIELD CLEANER FASTENING DEVICE

Theodore J. Smulski, Gary, Ind., assignor to The Anderson Company, Gary, Ind., a corporation of Indiana Application May 16, 1934, Serial No. 725,833

1 Claim. (Cl. 85—3)

This invention relates to a windshield cleaner, and has special reference to a mounting for the wiper carrying arm of windshield cleaners.

More particularly, this invention has reference to a mounting for the wiper carrying arm of a windshield cleaner comprising a stud for passing through a bore in a vehicle body, the stud having a gravity toggle member pivotally mounted at one end thereof to lock the stud on one side and a compensating collar and nut to lock the stud from the other side in the bore at a desired angular position with respect to the surface to be cleaned.

In the oscillatory type of automatic windshield cleaners the wiper is oscillated to clean a comparatively small portion of the windshield area so that the field of vision of the automobile operator is considerably restricted and, at times, the area cleaned is insufficient to accord the operator and the passengers the desired range of vision for viewing the traffic conditions ahead.

In order to increase or enlarge the field of vision the motorist has resorted to either of two methods; First, the mounting of two spaced and independent automatic cleaners on the windshield, or, second, the attachment of an auxiliary cleaner to a single automatic cleaner to be driven by the latter for cleaning an added area of the windshield surface, heretofore uncleaned by the main wiper element. and thereby laterally enlarge the field of vision.

In view of the fact that changes in design of nearly all motor vehicles has included the discarding of a hood or visor above and projecting to the front and beyond the face of the windshield, and the adoption of streamlining together with the removal of all possible projecting parts and accessories, it is desirable that any attachment in the nature of an auxiliary mounting for an auxiliary windshield cleaner be of simple construction and of such form and shape as to permit of its being easily installed with a minimum of such mounting visible. It is also desirable that such mounting be capable of installation from the outside of the vehicle, with no part thereof projecting through the interior finish thereof. Further, the windshield wiper arms which fit the wiper actuating shaft telescopically, should be so constructed as to be capable of being mounted upon the various types of motor shafts in general use, and that they be securely locked in position thereon.

Heretofore, in the construction of mountings for auxiliary cleaner arms, brackets of various types have been devised, all of which, so far as applicant is aware, have been mounted by the fastening to the vehicle by means of two or more bolts or rivets or other suitable means, which become oxidized and unsightly, and require the working from the inside of the vehicle by the mechanic applying such bracket. This results in a projecting and unsightly attachment. Various means of fastening the wiper arms and of fitting the wiper motor shaft telescopically have been employed, including the use of pins, screws and stirrup connections.

One of the objects of the present invention is to provide an auxiliary mounting for an auxiliary windshield cleaner, as above referred to, which may be quickly installed from the outside of the vehicle to which it is applied.

A further object of this invention is to provide an auxiliary mounting for an auxiliary windshield cleaner of the type indicated above which, when installed, does not project through or into the interior finish of the vehicle to which it is applied, and which, when applied, presents a minimum thereof to the view or to the elements.

A still further object of this invention is to provide a novel method of attaching the type of windshield wiper arm of the character hereinbefore recited securely and positively to the windshield wiper actuating shaft.

Other objects and advantages will be hereinafter more particularly pointed out, and for a complete understanding of the characteristic features of this invention, reference may now be had to the following description when taken together with the accompanying drawing, in which latter:

Figure 1 is a fragmentary front view in perspective of an automobile showing a duplex or combined main and auxiliary windshield cleaner mounted thereon;

Fig. 2 is a plan view of the auxiliary mounting stud partially in section in position in a vehicle body, a fragment of which latter is shown in section;

Fig. 3 is a front elevational view partially in section of the auxiliary mounting stud in position in a vehicle body, a fragment of which latter is shown in section;

Fig. 4 is a side elevational view of one form of windshield wiper arm which fits a motor shaft telescopically mounted on the auxiliary mounting stud with the windshield and a portion of the vehicle body shown in section;

Fig. 5 is an enlarged fragmentary front elevational view of that part of the vehicle body to which the auxiliary mounting is applied showing a hole bored for reception of the mounting stud and depressions therein made by the pressure of the gravity toggle;

Fig. 6 is a sectional view of a portion of the vehicle body about on line 6—6 of Fig. 5;

Fig. 7 is an exploded view in perspective of five of the parts going to make up the auxiliary mounting stud assembly;

Fig. 8 is an assembled view of the mounting stud assembly as applied to a vehicle, a part of the vehicle body being shown in section;

Fig. 9 is a side elevational view of a part of a windshield wiper arm fitting a motor shaft telescopically; and Fig. 10 is a front elevational view of a windshield wiper arm applied to a windshield wiper motor, the portion fitting the wiper motor shaft and said shaft being shown in section.

Referring more in detail to the accompanying drawing, a main windshield wiper arm 11 mounted on a motor shaft is connected to an auxiliary wiper arm 12 by a suitable connecting link 13, all of which are in extensive use at the present time in the automobile industry and form no part of this invention. However, in accordance with the present invention, the mounting for the auxiliary cleaner comprises a stud or auxiliary shaft 14 provided with a longitudinally extending slot 15 forming a bifurcated end portion and a transverse bore 17 at right angles to the sides of said slot, the slot having a free fitting gravity toggle 16 disposed therein which is held by a pin 18 carried by the bore 17. The toggle in one position is wholly enclosed by the confines of the slot so that the stud may pass through a bore of substantially the same diameter.

The stud or shaft 14 is reduced intermediate its length to provide a bearing 14a for a sleeve 19 which so fits the reduced bearing 14a as to permit a free pivotal or rocking movement thereon. The collar 19 is secured against longitudinal displacement on the bearing 14a by the shoulder formed by the reduced extension on one side thereof and the retaining washer 10 on the other side thereof, the latter being held in place by swaging or riveting over a reduced projecting end of bearing 14a, as at 21. The enlarged mounting stud portion 14 is externally threaded from the shoulder at the reduced end portion substantially midway of its length to receive a nut 22 for holding a lock washer 23, a compensating collar 24 and a soft washer 25, preferably of rubber, in position against the vehicle body A for mounting the auxiliary shaft therein.

In applying the mounting for use on a vehicle body, the enlarged end of the stud or shaft 14 is inserted in a bore B provided therefor in the body preferably with the side walls of the slot 15 in a horizontal position so that the toggle will not become displaced from a forwardly extending position as shown in full lines in Fig. 3 during the insertion thereof. The stud 14 is thereafter turned so that the side walls of the slot 15 are perpendicularly disposed to permit the toggle 16 by force of gravity to assume the dotted line position as shown in Fig. 3. The compensating collar 24, preferably formed of metal, is filed to agree with the contour of the adjacent surface of the vehicle as shown in Figs. 4 and 8 and the soft washer 25, the compensating collar 24 and the lock washer 23 are placed over the stud 14 and tightened down securely by the nut 22.

The stud 14 is prevented from turning when the nut 22 is tightened by the tapered edges of gravity toggle 16 in engaging the burr thrown up by the drill in forming the transverse bore B in the vehicle body. The added pressure on the stud 14 in the further tightening of the nut 22 causes the tapered surfaces of the gravity toggle 16 to cut (see C in Figs. 5 and 6) and securely seat in bore B.

This invention also includes means for detachably mounting a wiper arm on a wiper motor actuating shaft. In the preferred form of the invention shown, these means comprise a pair of spaced clips 26 extending from a body portion 27 which is attached to engage the wiper actuating shaft telescopically. As illustrated in the drawing, these cooperating clips 26 may extend from arms 28 of the body portion 27 preferably formed from a simple blank of sheet metal such as illustrated in Figs. 4 and 10, one arm 28 of which is provided with a clearance hole 29, and the other with a tapped hole 30 for receiving a screw 31, or other means of urging the arms one toward the other. The screw 31 carries a spacer 32. The arm 11 is readily secured on the wiper actuating shaft by spreading the clip portions 26 over the motor shaft 32, inserting a pin 33 into slots 34 provided in the sides of the clips 26 and through a bore provided in the wiper motor actuating shaft 32. The pin 33 is preferably provided with a detachable portion 34 as shown. For convenience in assembling on the shaft handle 21, the detachable portion 34 being detached after the pin 33 is inserted by relative movement therebetween to break the remaining fibres at a weakened portion. When the arm is placed on the shaft the sides of the clips are squeezed by tightening the screw 31 so that the inner-curved surfaces of the sides of the cooperating clips 26 conform to and clampingly engage the surface of the wiper actuating shaft 32 and said sides are urged downwardly and securely lock pin 33, which insures that the clip will not turn on the shaft or become accidentally displaced.

In attaching the windshield wiper arm of the type shown to a windshield wiper motor shaft, it is only necessary to engage the arm 11 with the windshield wiper motor shaft so that the cooperating clip portions 36 pass over the shaft, insert pin 33 through slots 34 and through the bore provided in the windshield wiper motor shaft, using portion 34 as a handle which is thereafter detached; thereupon clamping screw 31 is tightened securely, compressing the clips 26 upon wiper motor shaft 32 and locking pin 33. The locking of the pin 33 against longitudinal displacement by the compression of clips 26 about the wiper shaft is accomplished by the exertion of pressure by the clips in a direction angularly of the axis of the pin. The closer together the arms 28 are moved by the screw 29, the more pressure is exerted by the arcuate clips over the arcuate surface of the shaft providing a translation of the direction of pressure from the horizontal to the vertical on the ends of the pin.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claim.

I claim:

A bearing for auxiliary windshield cleaner arms, comprising a stud for engaging a bore through a vehicle body, pivotal means on said stud for limiting the longitudinal movement thereof in one direction, and a compensating collar on said stud for limiting the longitudinal movement of said stud in the other direction, said pivotal means presenting an inclined surface co-operating with an inclined bearing face of said compensating collar to clampingly engage therebetween the material of the vehicle body adjacent the bore for holding said stud in a position angular with respect to the surface to which it is attached.

THEODORE J. SMULSKI.